Sept. 13, 1966 G. STARRE 3,271,854
RECIPROCATING DRY SHAVER WITH MOVABLE SHEAR PLATE AND
ADDITIONAL CUTTING MEANS
Filed Jan. 24, 1964
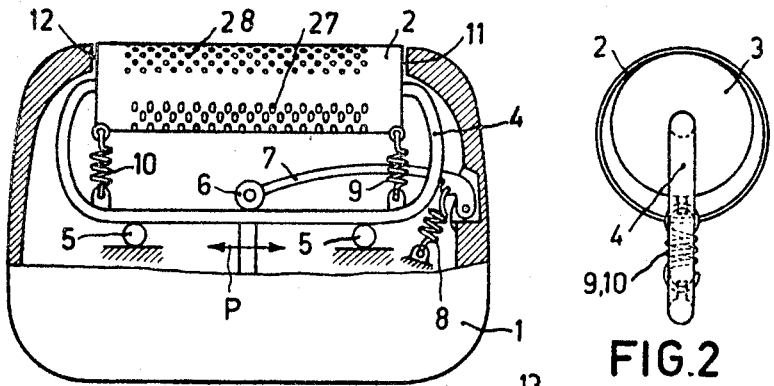
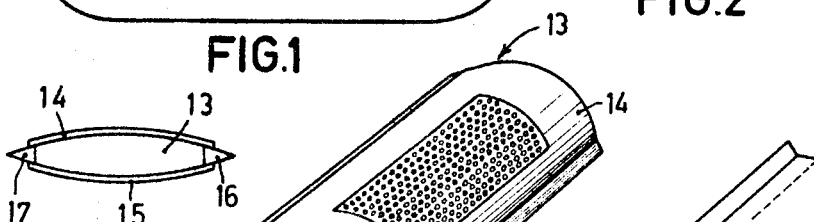
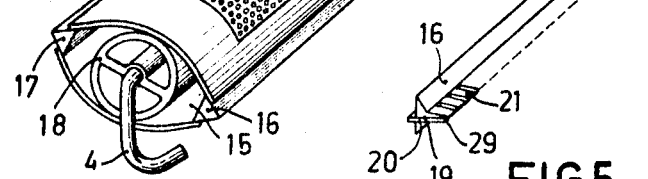
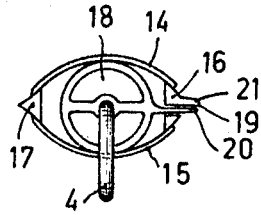 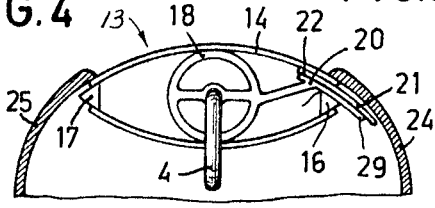
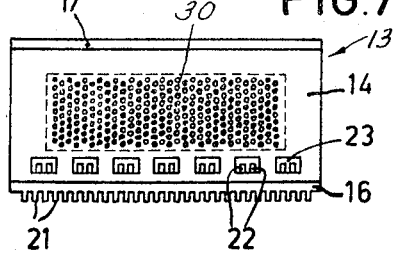
INVENTOR.
GERRIT STARRE
BY
Frank R. Trifari
AGENT

United States Patent Office 3,271,854
Patented Sept. 13, 1966

3,271,854
RECIPROCATING DRY SHAVER WITH MOVABLE SHEAR PLATE AND ADDITIONAL CUTTING MEANS
Gerrit Starre, Drachten, Netherlands, assignor to North American Philips Company, Inc., New York, N.Y., a corporation of Delaware
Filed Jan. 24, 1964, Ser. No. 339,916
Claims priority, application Netherlands, Feb. 21, 1963, 289,315
3 Claims. (Cl. 30—34.1)

The invention relates to a shaving apparatus comprising a cylindrical, thin shear plate, which is provided at various surface places with inlet apertures and which is supported from the reciprocating, driven cutting member.

It has been found that when using usually thin shear plates with a cutting member moving beneath the former great difficulties arise in obtaining an advantageous relative disposition, in which during the shaving operation the shear plate, which is usually connected with the housing is not excessively deformed by the pressure exerted thereon.

If the form of the shear plate in the unloaded state deviates excessively, the shaving effect is reduced, since the cutting member is then no longer capable of joining intimately the shear plate. Apart from a reduction in shaving effect, the risk of destruction of the shear plate by the cutting member is increased.

The invention has for its object to provide an improved solution for this problem and is characterized in that the shear plate has the form of a cylinder with an uninterrupted cross section, which is secured only against a displacement in the longitudinal direction and is otherwise completely supported by the cutting member, which member is supported at the end of the shear plate cylinder, while it bears on stop surfaces at the area of the cylinder ends so as to be slidingly movable at right angles to the cylinder axis.

This provides the advantage that during the shaving operation the deformation of the shear plate is restricted, since the pressure is no longer met by rigid, local fastening points of the shear plate. Under the action of the pressure on the skin a satisfactory application of the shear plate is obtained throughout its length to the cutting member is obtained, which can be achieved with a shaving head of comparatively small size. A satisfactory application has been sought to be obtained by means of a readily deformable, thin shear plate, but in this case it was necessary to provide a large size in order to have the fastening area at a large distance from the parts of the shear plate to be deformed during the shaving operation.

An advatageous embodiment is characterized in that the cylindrical shear plate is composed of flexible plate parts, which are pairwise in the longitudinal direction of the cylinder at an angle to each other, in which angle they are supported by a supporting fillet, while the cutting member engages the inner sides of each of the plate parts, which are thus bent outwardly.

This provides in a simple manner a resilient application of the shear plate to the cutting member, since the shear plate clamps itself around the cutting member. Since the shear plate is formed by a thin and hence flexible plate, no particular measures need be taken for obtaining the resilient engagement.

A further advantageous embodiment is characterized in that the reciprocating, driven cutting member is coupled or can be coupled with a hair clipping knife set, supported by the angular or supporting fillet and the cutting teeth of which project to the outside parallel to the angular fillet.

Use is effectively made of the presence of the angular fillet by its function as a support for the hair clipper, which can thus be arranged at a very suitable place for obtaining a coupling with the cutting member.

In a suitable embodiment the shear plate cylinder can be tilted around its axis, while there is provided a member for locking the cylinder in different angular positions. Thus the cylinder can be readily adjusted to the desired position. The plate parts of the cylindrical shear plate can be provided in a simple manner with inlet apertures of different size and shape, which is known per se. The user can thus adapt the shaving apparatus to his personal need and choose the most suitable surface of the shear plate for his skin, while the hair clipper can be adjusted to the most suitable position.

The invention will now be described more fully with reference to two embodiments shown diagrammatically in the drawing.

FIG. 1 shows diagrammatically a partly developed side elevation of a first embodiment of the invention.

FIG. 2 shows a transverse elevation of the shear plate of FIG. 1.

FIG. 3 shows a transverse elevation of a shear plate cylinder in the second embodiment.

FIG. 4 is a perspective view of the cylinder of FIG. 3 with a cutting member.

FIG. 5 shows a variant of the embodiment illustrated in FIG. 4, in which an angular fillet is provided with a hair clipper.

FIG. 6 is a transverse elevation of the embodiment of FIG. 5.

FIG. 7 is a transverse elevation of a variant of the embodiment illustrated in FIG. 6, in which the place of the screening hoods is indicated diagrammatically.

FIG. 8 is a plan view of the embodiment of FIG. 7.

A shaving apparatus, the housing of which is designated by 1, comprises a shaving head with a cylindrical shear plate 2 and a cutting member 3 therein (FIG. 2), which may be made in any known manner and which is suitable for establishing a satisfactory contact with the part of the shear plate 2 used for shaving.

The cutting member 3 is located inside the cylinder sheath formed by the shear plate 2 and is supported at the ends by a bracket 4, which is driven to perform a reciprocating motion by any suitable means such as an oscillating motor (not shown). The bracket 4 is journalled in the housing on rollers 5, which is urged by a roller wheel 6 arranged at the end of a bracket 7, which is pivoted to the housing at its other end and is urged against the bracket by a spring 8. Between the bracket 4 and the shear plate 2 there are provided two springs 9, 10, which draw the shear plate 2 against the cutting member 3, so that the shear plate 2 always engages the latter. When the bracket 4 and hence the cutter 3 are caused to reciprocate in the direction of the arrow P in FIG. 1, the shear plate tends to reciprocate with the cutter but is prevented from doing so by the presence of two abutments 11 and 12 formed by the housing 1. Thus, although the shear plate is in constant contact with the cutter urged by springs 9 and 10, it remains fixed in relation to the reciprocatory movements thereof, so that the desired cutting action is achieved. The shear plate is not held rigidly between the abutments 11 and 12 and is therefore capable of movement at right angles to its longitudinal axis relative to the housing. This allows the shear plate, together with the cutter 3, to move inwardly with respect to the housing so that the necessary pressure on the skin can be obtained when the apparatus is in use. The shear plate is furthermore provided with various shaving surfaces, designated for example by 27 and 28, having shaving apertures 30 of different shape and/or size, while the shear plate is adapted to turn and to be adapted about its axis, so that the user can adjust a given shaving surface at will.

In a further embodiment shown in FIGS. 3 to 8 the shear plate cylinder 13 is not cylindrical, but is formed by two thin, flexible plates 14 and 15, which are arranged on wedge-shaped angular fillets 16 and 17, so that the plates are at a given acute angle to each other and are thus slightly curved. The associated cutting member 18 has a larger diameter than the smallest section of the shear plate cylinder in its initial shape, shown in FIG. 3, so that, when the said cutting member is arranged in its place (see FIGS. 4, 6 and 7), the two shear plates 14 and 15 are curved outwardly and the shear plate cylinder is slightly clamped resiliently on the cutting member 18.

Although this is not shown in the drawing, the shear plate cylinder in this embodiment is not restricted to two shear plates; any number of flexible plates may be used, which are otherwise arranged in a similar manner on wedge-shaped angular fillets, the angle between two plates, however, need not necessarily be the same. The size and the shape of the cutting member are determined so that the shear plate cylinder clamps around the cutting member.

The cutting member 18 is provided, like in the first embodiment, with a sledge-shaped bracket 4, while the whole shaving head is arranged in a similar manner in a housing 1, while the shear plate cylinder is again enclosed between abutments 11, 12.

In a variant of the embodiment shown in FIG. 4 the supporting fillet 16 has an elongated slot 19 (FIG. 5) for accommodating the movable knife 20 of a hair clipper, whereas the supporting fillet 16 itself operates as the stationary knife of said hair clipper, to which end said fillet is provided with teeth 21, which project outwardly. The knife 20 with the sequence of teeth 29 is located in or substantially in the bisector plane of the two shear plates 14, 15 (FIG. 6) and is coupled or can be coupled with the cutting member 18 or with the driving means thereof.

In a fourth variant of the embodiment shown in FIG. 7 the movable knife 20 is parallel to the plane of the shear plate 14 at the place of the angular fillet 16. The teeth 21 are therefore in line with the shear plate 14 viewed in a transverse direction. The angular fillet 16 is also provided with teeth 22 on the inner side so that the teeth 22 project inwardly beneath the shear plate 14. The slot 19, which is also located in a plane parallel to the shear plate, accommodates a movable hair clipping knife 20, which is provided on either side with teeth. The shear plate 14 is provided with large apertures or slots 23, located above the inwardly projecting teeth 22 of the angular fillet 16. Thus a double hair clipper is formed; particularly the apertures 23 form a passage for cutting long hairs by means of the teeth 22, while the hair clipper teeth 21, 29 can be employed for cutting shorter hairs.

The shaving apparatus is furthermore provided with a housing having screening hoods 24, 25, which partially cover the shaving head and of which for example the hood 24 is detachable or can be tilted away in order to allow the hair clippers to be used and also to allow the fixed cutting member 13 to be adjusted to the desired position.

What is claimed is:
1. A dry shaver comprising a housing, a reciprocable cutting member, a relatively thin, cylindrical shear plate having spaced groups of apertures therein, said cylindrical shear plate being constituted of a pair of flexible portions, a common fillet between a pair of side edges of said flexible portions whereby said flexible portions are supported at an angle relative to each other and are bowed outwardly, a toothed hair-clipping blade projecting from said side edges of said flexible portions and coupled to said reciprocable cutting member, and a projecting edge of said fillet being provided with teeth which co-act with said toothed hair-clipping blade, a pair of abutments on said housing, means supporting said shear plate between said abutments whereby said shear plate is prevented from displacement along its longitudinal axis but is adapted to move at right angles to said axis, said supporting means for said shear plate being solely said reciprocable cutting member mounted within said cylindrical shear plate, and resilient biasing means connected to said shear plate whereby the latter is held in engagement with the cutting member.

2. A dry shaver as claimed in claim 1 wherein said fillet is provided with a slot through which said toothed hair-clipping blade passes.

3. A dry shaver as claimed in claim 1 wherein said shear plate is provided with longitudinal slots extending in the direction of movement of said cutting member, said slots having hair-clipping teeth in an edge thereof, said slots being located adjacent to said fillet, and said movable hair-clipping blade being provided with opposed toothed edges, one of said toothed edges co-acting with the teeth in said slots and the other of said toothed edges co-acting with the teeth on said fillet.

References Cited by the Examiner
UNITED STATES PATENTS

| | | | |
|---|---|---|---|
| 2,190,481 | 2/1940 | Nyhagen | 30—43 |
| 2,228,020 | 1/1941 | Testi | 30—43.1 |
| 2,263,155 | 11/1941 | Wright | 30—34.1 |
| 2,472,853 | 6/1949 | Lorenz | 30—43.6 |
| 2,526,153 | 10/1950 | Page | 30—43.91 |
| 2,802,261 | 8/1957 | Heyek | 30—43.92 |
| 2,873,520 | 2/1959 | Schnapp et al. | 30—34.1 |
| 2,975,516 | 3/1961 | Heyek | 30—34.1 |
| 2,979,819 | 4/1961 | Kleinman | 30—43.91 |
| 3,028,668 | 4/1962 | Dechaus | 30—43.9 |
| 3,060,569 | 10/1962 | Oliver et al. | 30—34.1 |
| 3,101,537 | 8/1963 | Kleinman | 30—43.92 |

FOREIGN PATENTS

| | | |
|---|---|---|
| 943,907 | 12/1963 | Great Britain. |
| 53,896 | 2/1943 | Holland. |

WILLIAM FELDMAN, *Primary Examiner.*

MYRON C. KRUSE, *Examiner.*